United States Patent
Winzer

[11] 3,975,082
[45] Aug. 17, 1976

[54] LASER BEAM COUPLING ARRANGEMENT

[75] Inventor: Gerhard Winzer, Munich, Germany

[73] Assignee: Siemens Aktiengesellschaft, Berlin & Munich, Germany

[22] Filed: July 23, 1975

[21] Appl. No.: 598,283

[30] Foreign Application Priority Data
Sept. 9, 1974  Germany............................ 2443128

[52] U.S. Cl. .............................. 350/96 C; 350/96 B; 350/150
[51] Int. Cl.².......................................... G02B 5/16
[58] Field of Search ................. 350/96 C, 96 B, 150

[56] References Cited
OTHER PUBLICATIONS
Technology Trends, "Fiber Display Features Digital Scanning" in Optical Spectra, vol. 8, Issue 6, June 1974, p. 44.

*Primary Examiner*—John K. Corbin
*Assistant Examiner*—Stewart Levy
*Attorney, Agent, or Firm*—Hill, Gross, Simpson, Van Santen, Steadman, Chiara & Simpson

[57] ABSTRACT

A laser beam coupling arrangement for wide-band optical data switching systems, consisting of an electronically controllable, optical mask, a hologram, a waveguide matrix and a coherent light source employs dynamic hologram recording in which a sandwich structure is provided for hologram recording and comprises a transparent electrode, a photo-resistor layer, a dielectric reflector, electro-optical or electro-plastic material and a transparent counter-electrode between the controllable, optical mask and the inputs and outputs of the waveguides which are to be coupled.

7 Claims, 1 Drawing Figure

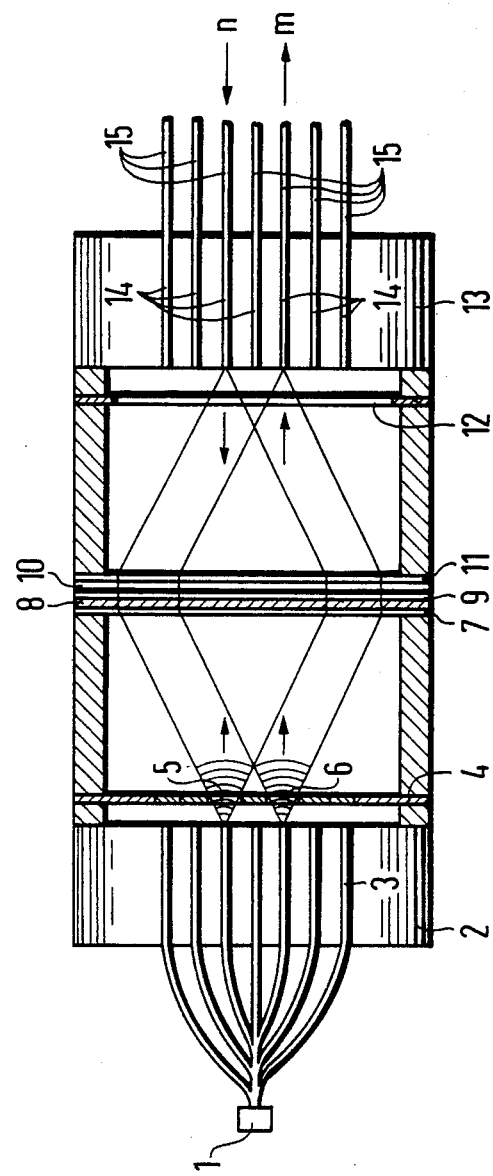

LASER BEAM COUPLING ARRANGEMENT

BACKGROUND OF THE INVENTION

1. Field of the Invention

The present invention relates to a laser beam coupling arrangement for wide-band, optical data switching systems, and more particularly to such an arrangement which comprises an electronically controllable optical mask, a hologram, a waveguide matrix and a coherent light source.

2. Description of the Prior Art

Laser beam coupling fields for wide-band data switching are known in the art. For example, one may refer to the publication "Nachrichtentechnischen Zeitschrift," No. 25/9, 1972, Page 385, in which, via a permanently impressed hologram, in combination with a digital light deflector, an electronically switchable mask and a special fly-eye lens system, a signal input field is connected to a detector field. For this purpose, however, not only is a considerable amount of equipment required, but substantial adjustment problems arise.

SUMMARY OF THE INVENTION

The primary object of the present invention is to provide a laser beam coupling arrangement for wideband optical data switching systems, in which the expense for equipment is reduced and the switching field can be utilized more easily than heretofore, and with which switching can be selectively carried out between an arbitrary output $n$ of an optical field, e.g. a glass fiber matrix or another waveguide matrix, and an arbitrary input $m$ of a corresponding matrix, with short switching times, and with which the adjustment problems are simplified due to the simple optimum mechanism of the light guidance arrangement.

Starting with a coupling arrangement of the type described above, this object is realized through dynamic hologram recording with a sandwich structure, which is shown per se, consisting of a transparent electrode, a photo-resistor layer, a dielectric reflector, an electro-optical or electro-plastic material and a transparent counter-electrode, disposed between a controllable, optical mask and the inputs and outputs of the waveguides which are to be coupled.

Advantageously, a waveguide matrix is arranged between the coherent light source and the controllable optical mask, and includes individual waveguides having positions which are identical to those of the input/output waveguides which are to be coupled.

It is particularly favorable if an optical compensation plate is provided between the sandwich structure and the input/output waveguides which are to be coupled.

The coupling arrangement for optical switching technology, in accordance with the invention, therefore links an input field with a second field with a reduction of apparatus, wherein dynamic holograms can be utilized instead of permanently impressed holograms, and wherein a simple optimal light guidance is ensured between the aperture of the selected output of the one field and the aperture of the selected input of the second field.

BRIEF DESCRIPTION OF THE DRAWING

Other objects, features and advantages of the invention, its organization, construction and operation will be best understood from the following detailed description taken in conjunction with the accompanying drawing on which a single FIGURE schematically illustrates an embodiment of a coupling arrangement constructed in accordance with the invention.

DESCRIPTION OF THE PREFERRED EMBODIMENTS

Referring to the drawing, in a device having a plurality of input wave guides and output wave guides 15, hereinafter called input/output waveguides, which are to be selectively coupled, the input/output waveguides are connected to respective fields 14 which are embedded in a standard block 13, e.g. as glass fibers, or are arranged on a standard substrate 13, as optical waveguides. The reference character $n$ indicates an input of one field and the reference character $m$ represents the output of another field.

An arbitrary input $n$ is to be linked to an arbitrary output $m$. For this purpose, a standard block 2, identical to the standard block 13, is provided with a matrix of glass fibers 3, or other waveguides, which in terms of their positions are aligned with respective ones of the waveguides 14, 15. These glass fibers or waveguides 3 are simultaneously illuminated by a coherent light source 1, e.g. a laser diode.

An electronically controllable optical mask 4, which is well known per se, e.g. a PLZT mask, such as described in detail in the publication "Laser Focus" 9, 1973, pp 12–13 or a liquid crystal matrix. In the exemplary embodiment illustrated on the drawing, the channels 5 and 6 of the mask are rendered open for light waves, whereas in all other channels the light is intensely diffused or blocked off. Consequently, only the glass fibers of the standard block 2 which corresponds to the waveguides $n$ and $m$ produce an interference pattern which is stored as a dynamic hologram.

The hologram recording is effective with a sandwich structure, also well known per se, such as described, for example, in the Proceedings of the IEEE 61/7, 1973, pp. 942–957, or in the publication Optik 37/4, 1973, pp. 357–365. The structure consists of a transparent electrode 7, a photo-resistor layer 8, a dielectric reflector 9, an electro-optical or electro-plastic material 10, and a transparent counter-electrode 11.

An optical compensation plate 12, which is to compensate the light paths between the dynamic hologram and the standard block 2, or the standard block 13, is provided.

With equal wave length of the light in the waveguides which are to be coupled and the coherent light source 1, the light emerging from the end of the fiber 14$n$ is diffracted on the reflection hologram in the sandwich structure in such a manner that a wave corresponding to the wave passing through the channel 6 is reconstructed and is thus accurately focused into the end of the fiber 14$m$.

In the event of a change in the addresses of the fibers 14 which are to be coupled, another dynamic hologram is produced as a result of a change in the mask transmission. The previously recorded dynamic hologram disappears due to the low transverse conductivity of the photo-resistor layer 8, or is caused to disappear by a known extinguishing mechanism.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a laser beam coupling arrangement for wide-band optical data switching systems, a coherent light source, a plurality of input/output wave guides to be coupled, a waveguide matrix, and an electronically controllable optical mask and a dynamic hologram structure between said source and said plurality of input/output waveguides, said dynamic hologram structure comprising a sandwich arrangement including a transparent electrode facing said mask, a photo resistor layer adjacent said transparent electrode, a dielectric reflector adjacent said photo-resistor layer, and an electro-optical layer adjacent said dielectric reflector, and a transparent counterelectrode between said electro-optical layer of said sandwich arrangement and said plurality of input/output waveguides.

2. In a laser beam coupling arrangement according to claim 1, wherein said waveguide matrix is disposed between said source and said mask and includes a plurality of matrix waveguides arranged in positions corresponding to the positions of said input/output wave guides.

3. In a laser beam coupling arrangement according to claim 1, and further comprising an optical compensation plate between said counter-electrode and said plurality of input/output waveguides.

4. In a laser beam coupling arrangement for wide-band optical data switching systems, a coherent light source, a plurality of input/output waveguides to be coupled, a waveguide matrix, and electronically controllable optical mask and a dynamic hologram structure between said source and said plurality of input/output waveguides, said dynamic hologram structure comprising a sandwich arrangement including a transparent electrode facing said mask, a photo-resistor layer adjacent said transparent electrode, a dielectric reflector adjacent said photo-resistor layer, and an electro-plastic layer adjacent said dielectric reflector, and a transparent counterelectrode between said electro-optical layer of said sandwich arrangement and said plurality of input/output waveguides.

5. In a laser beam coupling arrangement according to claim 4, wherein said waveguide matrix is disposed between said source and said mask and includes a plurality of matrix waveguides arranged in positions corresponding to the positions of said input/output waveguides.

6. In a laser beam coupling arrangement according to claim 4, and further comprising an optical compensation plate between said counter-electrode and said plurality of input/output waveguides.

7. A laser beam coupling arrangement for wide-band optical data switching systems, comprising:
   a plurality of first optical waveguides which are to be selectively coupled;
   a plurality of second optical waveguides spaced from and aligned with respective ones of said first wave guides;
   a source of coherent light connected to each of said second waveguides;
   an electronically controllable optical mask operable to define a pair of light paths adjacent the ends of said second waveguides; and
   a recording hologram structure for semi-permanent hologram recording disposed between said optical mask and said first waveguides and responsive to the light traversing the paths defined by said optical masks to record information identifying a pair of first waveguides which correspond in position to the second waveguides which have ends adjacent the selected channels of said optical mask so that light emerging from one of the selected first waveguides is diffracted by the hologram so that a wave corresponding to the second waveguide which is aligned with the other selected first waveguide is reconstructed and accurately focused into the other selected waveguide.

* * * * *